United States Patent [19]
Noble

[11] Patent Number: 5,807,017
[45] Date of Patent: Sep. 15, 1998

[54] CLAMPING APPARATUS

[75] Inventor: Myron C. Noble, Plymouth, Ind.

[73] Assignee: Pi-Rod, Inc., Plymouth, Ind.

[21] Appl. No.: 335,939

[22] Filed: Nov. 8, 1994

[51] Int. Cl.[6] .................................................. F16B 1/00
[52] U.S. Cl. ......................... 403/385; 256/68; 248/70; 248/229.1; 403/394; 403/400
[58] Field of Search ............................ 256/68; 248/70, 248/74.1, 229.1, 230.1, 291.1; 403/384, 385, 388, 389, 394, 396, 400

[56] References Cited

U.S. PATENT DOCUMENTS

| | | | |
|---|---|---|---|
| 1,303,249 | 5/1919 | Brown | 248/70 X |
| 1,410,084 | 3/1922 | Viar | 403/394 X |
| 2,463,176 | 3/1949 | Hogrefe | 248/230 X |
| 2,628,807 | 2/1953 | Lincoln | 248/291 X |
| 2,667,317 | 1/1954 | Trebules | 248/291 X |
| 2,870,985 | 1/1959 | Martin et al. | 248/70 X |
| 2,894,773 | 7/1959 | Noe | 403/400 X |
| 2,896,012 | 7/1959 | Fjellstedt | 248/70 X |
| 3,005,614 | 10/1961 | Daniell | 248/230 |
| 3,888,446 | 6/1975 | O'Brien et al | 248/70 X |
| 4,860,985 | 8/1989 | Olson et al. | 248/229 |
| 4,901,970 | 2/1990 | Moss et al. | 403/385 X |

FOREIGN PATENT DOCUMENTS

| | | | |
|---|---|---|---|
| 495157 | 4/1950 | Belgium | 403/394 |
| 1291090 | 9/1962 | France . | |
| 79671 | 11/1962 | France | 403/400 |

*Primary Examiner*—Kenneth J. Dorner
*Assistant Examiner*—Andrea Chop
*Attorney, Agent, or Firm*—Baker & Daniels

[57] ABSTRACT

A clamping apparatus adaptable to connect together multiple members which may be variously arranged. The clamping apparatus includes a clamping plate having a first pair and a second pair of arcuate slots. Fasteners extend in a first direction through the first pair of arcuate slots and in a second direction through the second pair of arcuate slots, and the fasteners are slidable along the length of the slots. Clamping links are attachable to the fasteners to secure the multiple members to the clamping plate.

9 Claims, 3 Drawing Sheets

CLAMPING APPARATUS

BACKGROUND OF THE INVENTION

This invention relates to clamps used to connect together multiple objects in a selected arrangement.

A variety of clamping apparatuses are known which allow for the mechanical connection of multiple physical members that are otherwise not connectable due to their lack of complementary connection elements, such as mating screws and holes or tabs and grooves. One useful application of these types of clamping apparatuses is in the installation of antennas. For example, in order to ensure that the reception or transmission properties of a tuned antenna remain of high quality, it is often desirable to secure an antenna support to which a tuned antenna is mounted in such a fashion that it is fixedly positioned, i.e., does not shift from a tuned position. As a result, the antenna tuning will not be compromised. To so secure an antenna support, an intermediate tieback pipe or beam mechanically attached with a clamp to the antenna support may be attached or tied back with a clamp to a relatively fixed base member, such as an antenna tower leg. One difficulty associated with the use of a tieback pipe is that the antenna support's operational alignment relative to the existing fixed base member is variable, as it depends upon the manner in which the antenna must be adjustably mounted to achieve proper reception. Therefore, the clamping attachment of the tieback pipe with the antenna support and the base member needs to be adaptable to clamp together variously arranged and oriented pipes or members.

Existing clamping apparatuses employed between an antenna support tieback and both the antenna support and the existing base member are often complicated in construction. This construction requires a number of parts that may both increase expense as well as complicate installation.

Thus, it is desirable to provide an adaptable clamping apparatus which is simple to use.

SUMMARY OF THE INVENTION

In one form thereof, the present invention provides a clamping apparatus for connecting together two support members and includes a clamping member, first, second, third and fourth fasteners, and first and second clamping links. The clamping member includes a first arcuate slot, a second arcuate slot, a third arcuate slot, and a fourth arcuate slot, which are all equal radially positioned. The first, second, third, and fourth fasteners respectively extend through the first, second, third, and fourth arcuate slots and are laterally movable along the lengths of these slots. The shanks of the fasteners are sized to pass freely through the slots. The first clamping link is attachable to the first and second fasteners for securing a support between the link and clamping member, and the second clamping link is attachable to the third and fourth fasteners for securing the other of the supports between the link and clamping member. The arcuate slots allow movement of each link and its connecting fasteners relative to the clamping member to allow adjusting movement of the clamped support or to accommodate various alignments of the supports.

An advantage of the clamping apparatus of the present invention is that it can be utilized to readily secure together multiple members. Another advantage of the clamping apparatus of the present invention is its adaptability allowing for the clamping of differently arranged and oriented members.

BRIEF DESCRIPTION OF THE DRAWINGS

The above-mentioned and other advantages and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several figures.

DESCRIPTION OF THE PREFERRED EMBODIMENT

The preferred embodiment illustrated is not intended to be exhaustive or to limit the invention to the precise form disclosed. The embodiment was chosen and described in order to best explain the principles of the invention and its application and practical use to thereby enable others skilled in the art to best utilize the invention.

Figure 1:
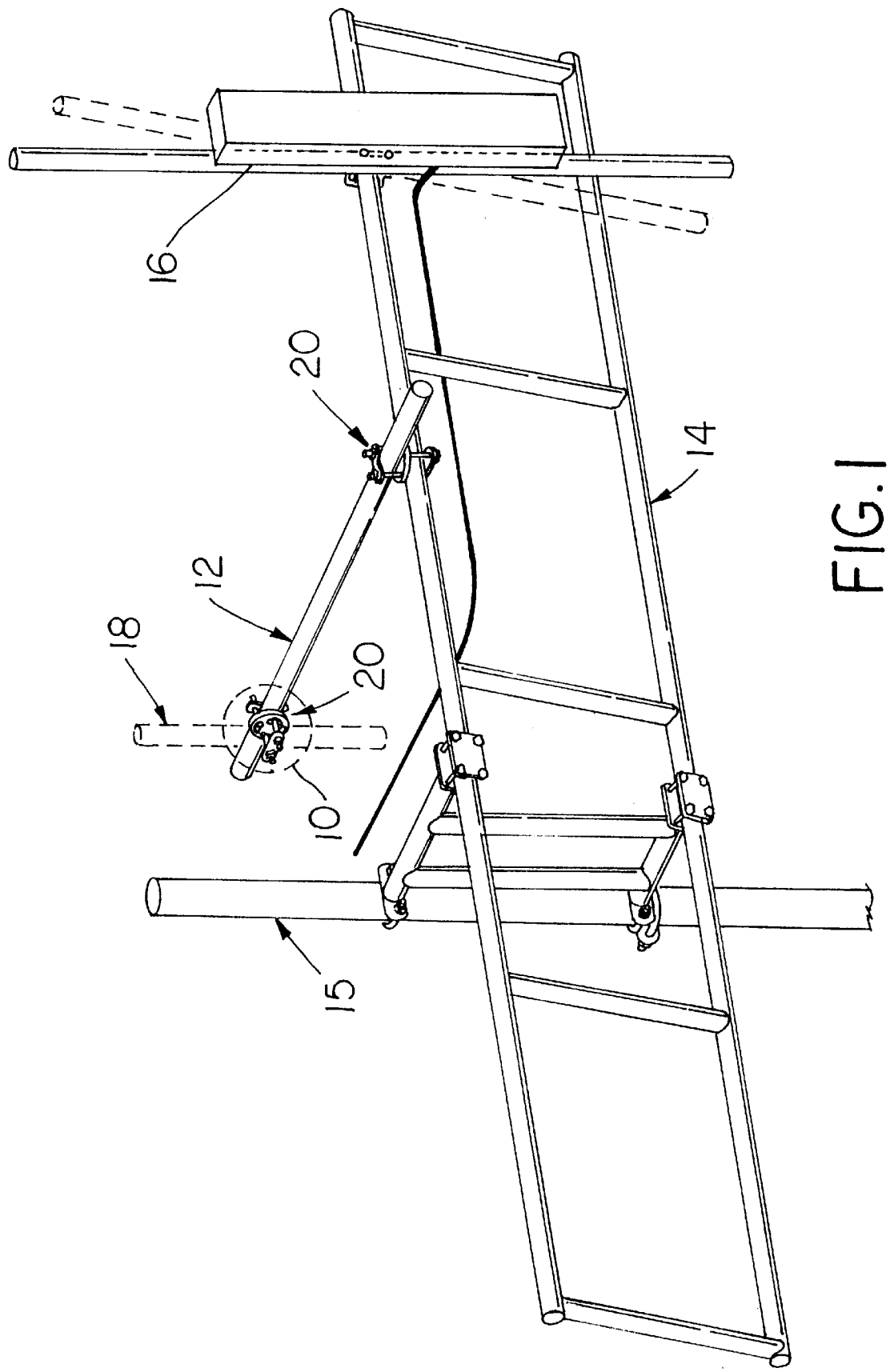
FIG. 1 shows a perspective view of a pair of clamping apparatuses of the present invention being employed in conjunction with a tieback pipe to secure an antenna support to a partially shown antenna tower leg.

Referring now to FIG. 1, there are shown a pair of clamping apparatus of the present invention, generally designated 20, operationally being used at opposite ends of tieback pipe 12. An antenna support, generally designated 14, is shown with an antenna 16 adjustably mounted thereon. Antenna support 14 is shown attached to a pipe-mount bracket 15 mountable to a tower leg or cross arm (not shown), but alternatively antenna support 14 could be directly mounted to a portion of the tower. Tieback pipe 12, which is used to further brace or secure antenna support 14 relative to the fixed tower, is shown attached via clamps 20 to both the framework of antenna support 14 and another tubular tower leg 18, which is shown in broken lines to allow better illustration of clamping apparatus 20.

Figure 2:
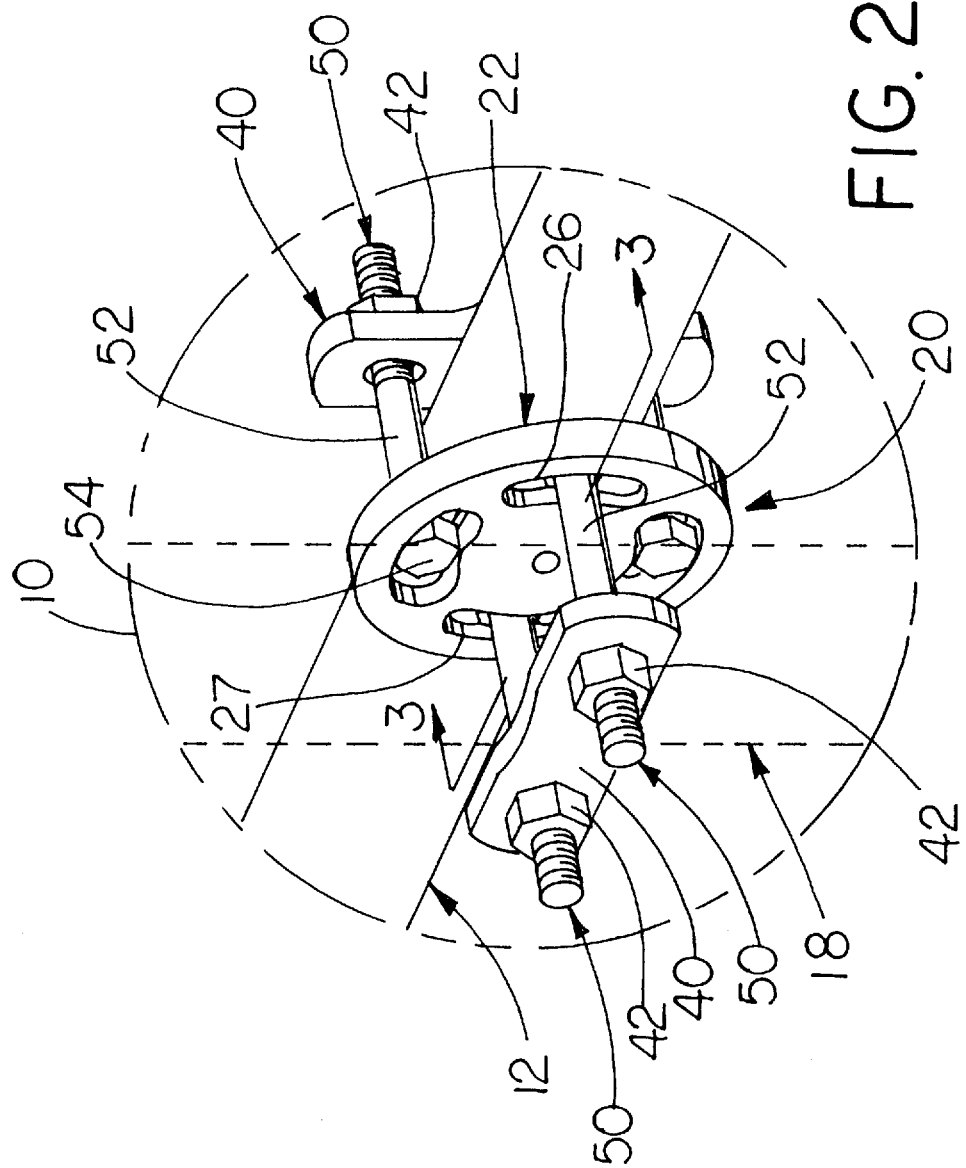
FIG. 2 shows an enlarged perspective view of the encircled region referenced as 10 in FIG. 1, better showing the clamping apparatus of the present invention.
Figure 3:
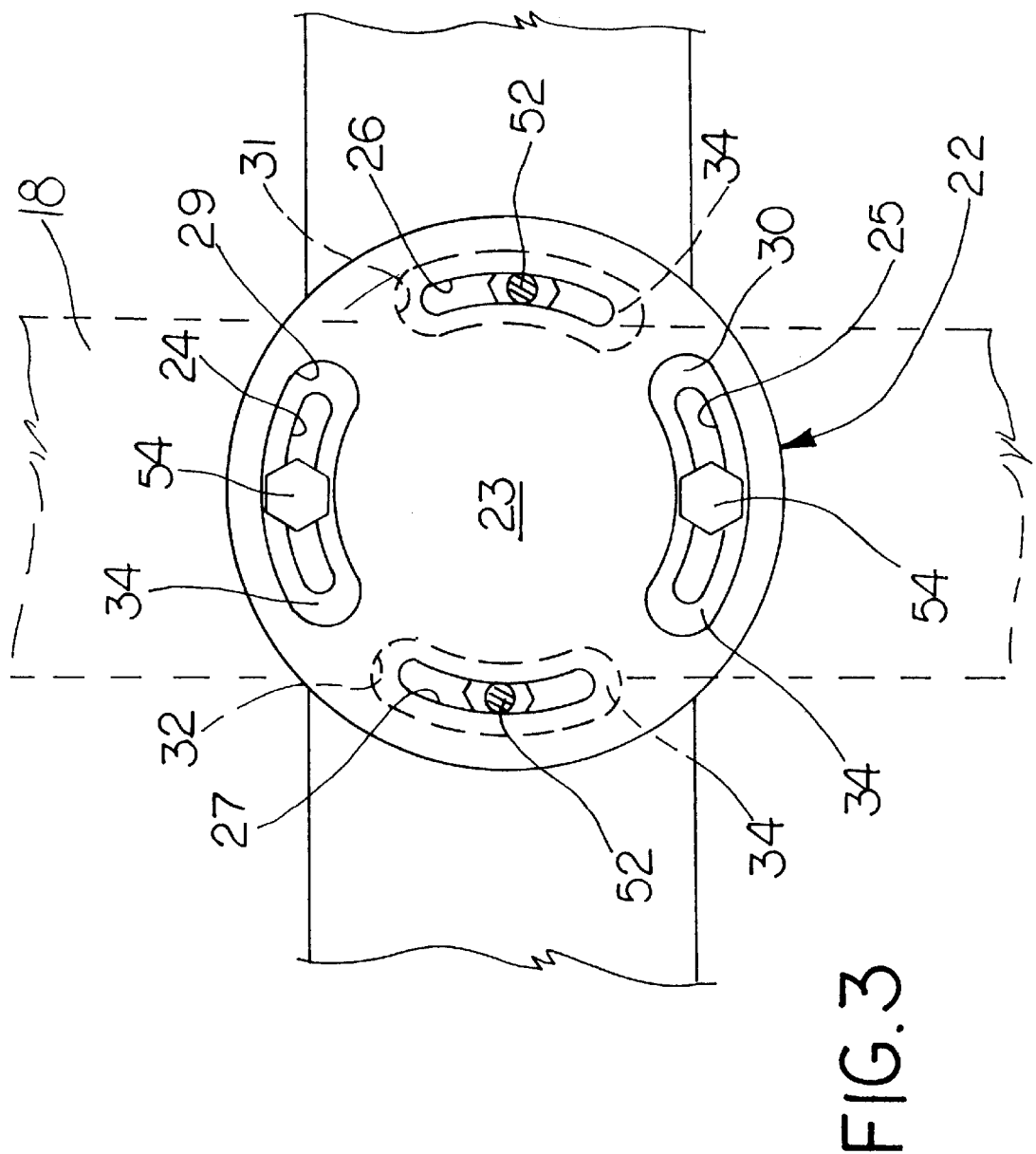
FIG. 3 shows a side view, as taken along line 3—3 of FIG. 2, of the clamping apparatus of the present invention.

Referring now to FIGS. 2 and 3, there are respectively shown an enlarged perspective view and a cross-sectional view, taken along line 3—3 of FIG. 2, of the clamping apparatus 20 which rigidly secures tieback pipe 12 with tower leg 18. Clamping apparatus 20 includes a central clamping member 22, which is shown as being a circular plate with a uniform thickness. The overall shape and thickness of clamping member 22 can vary and may be alternatively configured within the scope of the invention. Four recessed arcuate slots 24–27 are formed in and extend through clamping plate 22. Slots 24–27 are shown equal radially located from the center of the plate and are equal angularly spaced apart. In the shown embodiment, slots 24–27 are of uniform shape and size, and the width of each arcuate slot 24–27 is large enough to allow the shank 52 of a corresponding fastener 50 to pass freely therethrough. However, the width of each arcuate slot 24–27 is narrower than the head 54 of its accommodated fastener 50 to prevent the fastener from passing through the slot.

A preferred fastener shown and described herein is a bolt having a threaded shank with a hexagonal head and a nut. Other shaped fasteners can be used with clamping plate 22.

Side surface 23 of clamping plate 22 is provided with arcuate recesses 29, 30 which extend respectively about oppositely located slots 24, 25. As represented in broken lines in FIG. 3, similarly shaped arcuate recesses 31, 32 are also provided in the opposite side surface of clamping plate 22 and extend respectively about diametrically opposite slots 26, 27. The bottom surface of each recess 29–32 forms a planar shoulder 34 against which the head 54 of the accommodated fastener is drawn when the clamping apparatus is used. The depth of recesses 29–32 is preferably such that fastener heads 54 do not protrude beyond the contiguous side surface of clamping plate 22.

As shown in FIG. 2, a complimentary clamping link 40 is connected to each pair of fasteners 50 extending from clamping plate 22 and through spaced bores in the link to cooperatively provide secure attachment of pipe 12 and tower leg 18. For the shown tubular construction of tower leg 18 and tieback pipe 12, a V-clamp configuration has been found suitable. One link 40 is tightened against and maintained in contact with tower leg 18 by nuts 42 threadably received on the threaded shanks of fasteners 50. Similarly, the other link 40 is tightened against pipe 12 by nuts 42 being threaded upon fastener shanks 52. The actual shape of the clamping links 40 are not material to the invention and alternatively shaped and attached clamping links suited for other applications are within the scope of the invention.

For the tubular shape of the clamped support members shown, and as best shown in FIGS. 1 and 2, the side surfaces of clamping plate 22 serve as suitable clamping elements directly engaging the clamped support members. The introduction of additional clamping elements, for example mounted on fasteners 50 at an operational position between the clamping plate 22 and clamping link 40 which cooperates with clamping links 40 to directly engage the clamped support members, may be desirable in some circumstances.

The structure of clamping apparatus 20 will be further understood in view of the following explanation of its installation with reference to FIG. 1. A first clamping apparatus 20 is first loosely attached to both the framework of antenna support 14 and tieback pipe 12. In particular, the framework member and tieback pipe 12 are each placed between different pairs of fasteners 50 extending from clamping plate 22, and then links 40 are loosely secured to fastener shanks 50 with nuts 42. Because nuts 42 are not completely tightened, the bolt portions of the fasteners 50 can slide along the various arcuate slots 24–27. Therefore, the antenna support framework can be slightly rotated relative to and about an axis perpendicular to clamping plate 22. It will be appreciated that tieback pipe 12 can also be rotated around antenna support 14 by loosening the fasteners at the support framework member. A second clamping apparatus 20 can similarly be attached to tieback pipe 12 and tower leg 18.

When the clamping apparatus 20 is tightened about its supported members, the heads 54 of fasteners 50 are drawn into the slot recesses 29–32 to allow the supported member to lie against the side surfaces of the clamping plate 22.

While this invention has been described as having a preferred design, the present invention may be further modified within the spirit and scope of this disclosure and the appended claims. For instance, while described with reference to antennas, clamping apparatus 20 can be used to clamp in an adaptable manner objects unrelated to antennas. This application is therefore intended to cover any variations, uses, or adaptations of the invention using its general principles. Further, this application is intended to cover such departures from the present disclosure as come within known or customary practice in the art to which this invention pertains.

What is claimed is:

1. A clamping apparatus for connecting together first and second members comprising:

a disc-like clamping member having first and second opposite sides and a first slot, a second slot, a third slot, and a fourth slot therethrough, each of said slots having a length greater than its width;

wherein said slots are spaced apart;

a first fastener means extending freely through said first slot for shiftable movement along said length of said first slot;

a second fastener means extending freely through said second slot for shiftable movement along said length of said second slot;

a third fastener means extending freely through said third slot for shiftable movement along said length of said third slot;

a fourth fastener means extending freely through said fourth slot for shiftable movement along said length of said fourth slot;

a first clamping link connected to said first and second fastener means and positioned at said first side;

a second clamping link connected to said third and fourth fastener means and positioned at said second side;

said first clamping link being rotatable relative to said clamping member by having said first and second fastener means respectively experience said shiftable movement within said first and second slots;

said second clamping link being rotatable relative to said clamping member by having said third and fourth fastener means respectively experience said shiftable movement within said third and fourth slots;

said first clamping link and clamping member adapted to accommodate said first member therebetween with said first fastener means and said second fastener means for drawing said first clamping link toward said clamping member to clamp said first member; and said second clamping link and clamping member adapted to accommodate said second member therebetween with said third fastener means and said fourth fastener means for drawing said second clamping link toward said clamping member to clamp said second member.

2. The clamping apparatus of claim 1 wherein said first slot is opposite to said second slot, and wherein said third slot is opposite to said fourth slot.

3. The clamping apparatus of claim 1 wherein said first fastener means, said second fastener means, said third fastener means, and said fourth fastener means each comprise a bolt and a nut, wherein each bolt includes a head and a threaded shank, said shank being fitted within a said slot.

4. The clamping apparatus of claim 1 wherein said first slot, said second slot, said third slot, and said fourth slot are each arcuate.

5. The clamping apparatus of claim 1 wherein said first clamping link and said second clamping link are V-clamps.

6. The clamping apparatus of claim 5 wherein said first fastener means, said second fastener means, said third fastener means, and said fourth fastener means each comprise a bolt with a threaded shank and a nut.

7. A clamping apparatus for connecting together first and second members comprising:

a disc-like clamping member having first and second opposite sides and a first slot, a second slot, a third slot, and a fourth slot therethrough, each of said slots having a length greater than its width;

wherein said slots are spaced apart;

a first fastener means extending freely through said first slot for shiftable movement along said length of said first slot;

a second fastener means extending freely through said
second slot for shiftable movement along said length of
said second slot;

a third fastener means extending freely through said third
slot for shiftable movement along said length of said
third slot;

a fourth fastener means extending freely through said
fourth slot for shiftable movement along said length of
said fourth slot;

a first clamping link connected to said first and second
fastener means and positioned at said first side;

a second clamping link connected to said third and fourth
fastener means and positioned at said second side;

said first clamping link being rotatable relative to said
clamping member by having said first and second
fastener means respectively experience said shiftable
movement within said first and second slots;

said second clamping link being rotatable relative to said
clamping member by having said third and fourth
fastener means respectively experience said shiftable
movement within said third and fourth slots;

said first clamping link and clamping member adapted to
accommodate said first member therebetween with said
first fastener means and said second fastener means for
drawing said first clamping link toward said clamping
member to clamp said first member;

said second clamping link and clamping member adapted
to accommodate said second member therebetween
with said third fastener means and said fourth fastener
means for drawing said second clamping link toward
said clamping member to clamp said second member;

said first fastener means, said second fastener means, said
third fastener means, and said fourth fastener means
each comprising a bolt and a nut, wherein each bolt
includes a head and a threaded shank, said shank being
fitted within a said slot; said second side including a
first recess extending about said first slot and a second
recess extending about said second slot, wherein said
first recess forms a shoulder disposed around said first
slot which is abutted by the head of said first fastener
means when the nut is turned upon the bolt shank of
said first fastener means bolt and brought to bear
against said first clamping link, wherein said second
recess forms a shoulder disposed around said second
slot which is abutted by the head of said second fastener
means when the nut is turned upon the bolt shank of
said second fastener means bolt and brought to bear
against said first clamping link, wherein said first side
includes a third recess surrounding said third slot and a
fourth recess surrounding said fourth slot, wherein said
third recess forms a shoulder disposed around said third
slot which is abutted by the head of said third fastener
means when the nut is turned upon the bolt shank of
said third fastener means bolt and brought to bear
against said second clamping link, wherein said fourth
recess forms a shoulder disposed around said fourth
slot which is abutted by the head of said fourth fastener
means when the nut is turned upon the bolt shank of
said fourth fastener means bolt and brought to bear
against said second clamping link.

8. A clamping apparatus for connecting together first and
second members comprising:

a disc-like clamping member having first and second
opposite sides and a first slot, a second slot, a third slot,
and a fourth slot therethrough, each of said slots having
a length greater than its width;

wherein said slots are spaced apart;

a first fastener means extending freely through said first
slot for shiftable movement along said length of said
first slot;

a second fastener means extending freely through said
second slot for shiftable movement along said length of
said second slot;

a third fastener means extending freely through said third
slot for shiftable movement along said length of said
third slot;

a fourth fastener means extending freely through said
fourth slot for shiftable movement along said length of
said fourth slot;

a first clamping link connected to said first and second
fastener means and positioned at said first side;

a second clamping link connected to said third and fourth
fastener means and positioned at said second side;

said first clamping link being rotatable relative to said
clamping member by having said first and second
fastener means respectively experience said shiftable
movement within said first and second slots;

said second clamping link being rotatable relative to said
clamping member by having said third and fourth
fastener means respectively experience said shiftable
movement within said third and fourth slots;

said first clamping link and clamping member adapted to
accommodate said first member therebetween with said
first fastener means and said second fastener means for
drawing said first clamping link toward said clamping
member to clamp said first member;

said second clamping link and clamping member adapted
to accommodate said second member therebetween
with said third fastener means and said fourth fastener
means for drawing said second clamping link toward
said clamping member to clamp said second member;

said first slot being opposite to said second slot, and said
third slot being opposite to said fourth slot;

said clamping member further comprising a circular plate,
wherein said first slot, said second slot, said third slot,
and said fourth slot are located at an equal radial
distance from the center of said plate and are angularly
spaced apart equally from each other.

9. A clamping apparatus for connecting together first and
second members comprising:

a disc-like clamping member having first and second
opposite sides and a first slot, a second slot, a third slot,
and a fourth slot therethrough, each of said slots having
a length greater than its width;

wherein said slots are spaced apart;

a first fastener means extending freely through said first
slot for shiftable movement along said length of said
first slot;

a second fastener means extending freely through said
second slot for shiftable movement along said length of
said second slot;

a third fastener means extending freely through said third
slot for shiftable movement along said length of said
third slot;

a fourth fastener means extending freely through said
fourth slot for shiftable movement along said length of
said fourth slot;

a first clamping link connected to said first and second
fastener means and positioned at said first side;

a second clamping link connected to said third and fourth
fastener means and positioned at said second side;

said first clamping link being rotatable relative to said clamping member by having said first and second fastener means respectively experience said shiftable movement within said first and second slots;

said second clamping link being rotatable relative to said clamping member by having said third and fourth fastener means respectively experience said shiftable movement within said third and fourth slots;

said first clamping link and clamping member adapted to accommodate said first member therebetween with said first fastener means and said second fastener means for drawing said first clamping link toward said clamping member to clamp said first member;

said second clamping link and clamping member adapted to accommodate said second member therebetween with said third fastener means and said fourth fastener means for drawing said second clamping link toward said clamping member to clamp said second member;

said first fastener means, said second fastener means, said third fastener means, and said fourth fastener means each comprising a bolt and a nut, wherein each bolt includes a head and a threaded shank, said shank being fitted within a said slot;

said second side including a first recess extending about said first slot and a second recess extending about said second slot, wherein said first recess forms a shoulder disposed around said first slot which is abutted by the head of said first fastener means when the nut is turned upon the bolt shank of said first fastener means bolt and brought to bear against said first clamping link, wherein said second recess forms a shoulder disposed around said second slot which is abutted by the head of said second fastener means when the nut is turned upon the bolt shank of said second fastener means bolt and brought to bear against said first clamping link, wherein said first side includes a third recess surrounding said third slot and a fourth recess surrounding said fourth slot, wherein said third recess forms a shoulder disposed around said third slot which is abutted by the head of said third fastener means when the nut is turned upon the bolt shank of said third fastener means bolt and brought to bear against said second clamping link, wherein said fourth recess forms a shoulder disposed around said fourth slot which is abutted by the head of said fourth fastener means when the nut is turned upon the bolt shank of said fourth fastener means bolt and brought to bear against said second clamping link;

wherein said recess of each said slot has a depth measured to its shoulder at least equal to the height of the abutting said fastener means head.

\* \* \* \* \*